K. KIEFER.
MOUNTING FOR CONVEYER ROLLERS.
APPLICATION FILED MAY 6, 1916.

1,288,828.

Patented Dec. 24, 1918.

Witnesses.
E. E. French
M. A. Harrington

Inventor.
Karl Kiefer

UNITED STATES PATENT OFFICE.

KARL KIEFER, OF CINCINNATI, OHIO.

MOUNTING FOR CONVEYER-ROLLERS.

1,288,828. Specification of Letters Patent. Patented Dec. 24, 1918.

Application filed May 6, 1916. Serial No. 95,939.

*To all whom it may concern:*

Be it known that I, KARL KIEFER, a citizen of the United States, and a resident of Cincinnati, in the county of Hamilton and State of Ohio, have invented certain new and useful Improvements in Mountings for Conveyer-Rollers, of which the following is a specification.

My invention relates to roller conveyers operating under the action of gravity, and other conveyers where there are a number of rollers spaced apart at short intervals, mounted in parallel side members.

The object of my invention is to provide mountings or bearings for the rollers of such conveyers, of simple and economical construction, which will at the same time operate with a minimum of friction and require a minimum of attention.

The invention is illustrated by a gravity roller conveyer, although it may also be used on other conveyers coming within the limitations stated in the preamble.

Figure 1:
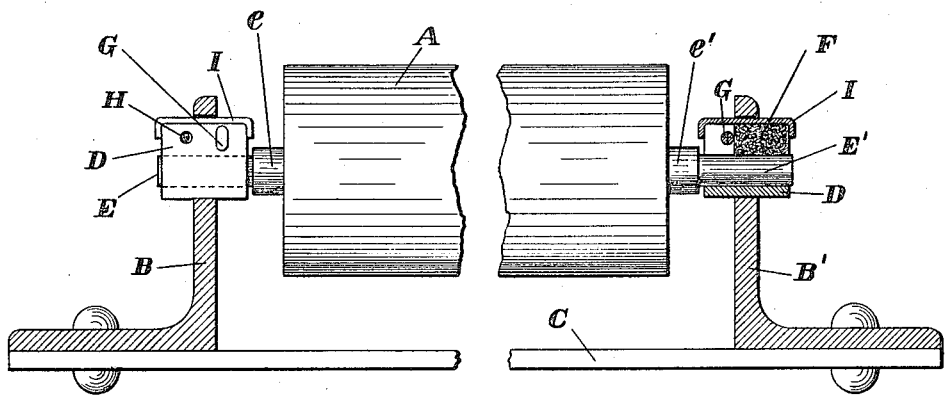
Figure 1 is an elevation of a roller, being only one of a great many, showing the bearing and side members in section.

The roller A is represented in practical proportions, and for the purpose of showing the bearings clearly it is shown in such size necessitating the breaking of the roller, and thus showing both ends.

Side members B and B' may be the usual angle iron section. These angle irons are usually rigidly connected by other flat cross members C, also shown in the drawing as broken off in the middle in Fig. 1, but shown in the entire length in Fig. 3. These cross bars C are usually riveted to the side members B and B' for the sake of rigidity, and it remains therefore, to adapt such a construction for the bearings and for the rollers, that any one single roller can be removed either for the purpose of repairs, or for any other reason.

A practical bearing, therefore, ought to be so constructed that this removal of not only the bearing, but the roller, is easily possible at all times. The way I accomplish this is shown farther on.

The bearing itself consists of a U shaped piece of metal, preferably bronze or other metal, or material of bearing quality. It is shown in section on the right side of the drawing, D, and in view on the left side, Fig. 1. It is shown partially in Fig. 2, a view in the direction of the axis.

The roller has spindles E and E'. These spindles are rigidly fastened in the rollers in a usual manner, and have a thicker part $e$ and $e'$ forming an off-set with the spindles proper for taking up the side thrust.

These bearings fit in openings of side members B and B' somewhat loosely, so as to permit their swiveling, similar to the bearings patented to me in my Patent 1,175,641, which allows for adjustments for inaccuracies of the roller spindles. At the same time, because of their U shape, they are prevented from turning in these openings. If these bearings are made of brass they are made of flat brass strips and bent over into shape, which is a cheap and rapid manufacture.

It is in the nature of these bearings that the load is only from above, and therefore, only the lower half of the spindle E is in contact with the bearing D. In the upper hollow part of these bearings, felt blocks F are contained in contact with the spindles. A cotter pin G prevents the bearing from being drawn out sidewise from the side members B and B', while the off-set $e'$ prevents it from moving in the direction of the roller.

Figure 2:
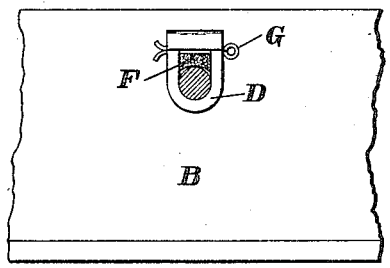
Fig. 2 is a side view of the improved bearing seated within one of the side members.
Figure 3:
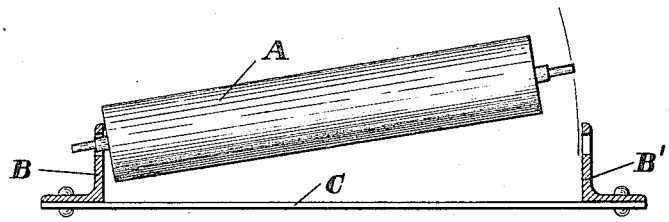
Fig. 3 shows a roller in view and the method of putting it in and taking it out of the parallel side members.

The dimensions of the roller and spindles are such that it is possible, as shown in Fig. 3, to insert the roller into the openings of the side members. After the roller is inserted as in Fig. 3, the bearings are shoved over the spindles into the openings in the side members, while the cotter pin G is put in crosswise in the holes inside the members B and B' as shown in Fig. 1. There are two sets of holes in the bearings D, which makes them reversible. One set of these holes H may be used for introducing oil into the bearings.

A cover I is placed over the bearings to prevent the dust from getting into the bearing, and also to hold the felt blocks F in place. These covers are placed on the bearings before they are inserted in the side members, and it is evident that as soon as the cotter pin is placed in the bearings they cannot be removed.

The felt block F utilizes all available space within the bearing, retains a considerable amount of oil, and gives off through actual contact only, sufficient oil for lubricating the spindles. Although a perfect means of lubrication, this arrangement is sufficiently simple and cheap to allow of use in such conveyers where price is a great object through the multiplication of these rollers, which often run into thousands in one line. At the same time, it allows for a great many inaccuracies and deviations from mathematical standards, which are impossible to maintain in such conveyers, the roller members often being of wood and subject to warping and shrinking.

What I claim and desire to secure by Letters Patent, is—

1. In a conveyer a roller to turn on a transverse axis, and spindle means projecting from each end of said roller, upright supporting members which are transversely relatively thin near the respective ends of said roller, having openings transversely through them, bearing members receiving the respective spindle means and adapted to be inserted into the respective openings transversely from the outer sides of said supporting members and extending along and having bearing contact with the respective spindle means at distances materially greater than the thicknesses of the respective supporting means, and fitting said openings loosely enough to swivel therein by virtue of their greater extent of contact with the spindle means than with the supporting means, and means for limiting displacement of said bearing members.

2. In a conveyer a roller to turn on a transverse axis and spindle means projecting from each end of said roller, annular transversely outwardly facing shoulders on the respective spindle means, supporting members near the respective ends of the roller and having openings transversely through them, bearing members receiving parts of the respective spindle means that project outwardly past said shoulders and adapted to be inserted into the respective openings transversely from the outer sides of said supporting members and having their displacement toward said roller limited by said shoulders, and removable means on the respective bearing members positioned for engagement with the inner sides of the respective supporting members to limit displacement of said bearing members away from said roller.

3. In a conveyer a roller to turn on a transverse axis and spindle means projecting from each end of said roller, annular transversely outwardly facing shoulders on the respective spindle means, supporting members near the respective ends of the roller and having openings transversely through them, bearing members receiving parts of the respective spindle means that project outwardly past said shoulders and adapted to be inserted into the respective openings transversely from the outer sides of said supporting members and having their displacement toward said roller limited by said shoulders, and removable means on the respective bearing members positioned for engagement with the inner sides of the respective supporting members to limit displacement of said bearing members away from said roller, said bearing members being reversible in said openings and comprising means to receive said removable means for said engagement when said bearing members are reversed.

4. In a conveyer a roller to turn on a transverse axis, and spindle means projecting from each end of said roller, annular transversely outwardly facing shoulders on the respective spindle means, supporting members near the respective ends of the roller and having openings transversely through them, bearing members receiving parts of the respective spindle means that project outwardly past said shoulders and adapted to be inserted into the respective openings transversely from the outer sides of said supporting members and having their displacement toward said roller limited by said shoulders, each of said bearing members having an opening through it across the axial line and lying inside the respective supporting members, and pins inserted through said openings for engagement with the inner sides of the respective supporting members to limit displacement of the bearing members away from the roller.

5. In a conveyer a roller to turn on a transverse axis and spindle means projecting from each end of said roller, annular transversely outwardly facing shoulders on the respective spindle means, supporting members near the respective ends of the roller and having openings transversely through them, bearing members receiving parts of the respective spindle means that project outwardly past said shoulders and adapted to be inserted into the respective openings transversely from the outer sides of said supporting members and having their displacement toward said roller limited by said shoulders, each of said bearing members having an opening through it across the axial line and lying inside the respective supporting members, and pins inserted through said openings for engagement with the inner sides of the respective supporting members to limit displacement of the bearing members away from the roller, said bearing members being reversible, and each one of said bearing members having an additional opening through it across the axial line to lie inside the respective supporting member when the bearing member is reversed and thereby receive a pin for said engagement, as aforesaid.

6. In a conveyer a roller to turn on a transverse axis, and spindle means projecting from each end of said roller, supporting members near the ends of the roller and having openings transversely through them, bearing members each having an upwardly open interior space receiving a respective spindle means, absorbent elements in the respective spaces over the spindle means, caps fitting on the tops of the respective bearing means, each having a downwardly extending part to limit transverse displacement of the absorbent element, said bearing members and their respective caps fitting in the respective openings in the supporting members and thereby being held together by said supporting members, and means for limiting displacement of said bearing members.

7. In a conveyer a roller to turn on a transverse axis, and spindle means projecting from each end of said roller, supporting members near the ends of the rollers and having openings transversely through them, bearing members each having an upwardly open interior space receiving a respective spindle means, absorbent elements in the respective spaces over the spindle means, caps fitting on the tops of the respective bearing means, each having a downwardly extending part to limit transverse displacement of the absorbent element, said bearing members and their respective caps fitting in the respective openings in the supporting members and thereby being held together by said supporting members, said bearing members being adapted to be inserted into the respective openings transversely from the outer sides of said supporting members, and means for limiting displacement of said bearing members.

8. In a conveyer a roller to turn on a transverse axis, and spindle means projecting from each end of said roller, supporting members near the ends of the roller and having openings transversely through them, bearing members each having an upwardly open interior space receiving a respective spindle means, absorbent elements in the respective spaces over the spindle means, caps fitting on the tops of the respective bearing means, each having a downwardly extending part to limit transverse displacement of the absorbent element, said bearing members and their respective caps fitting in the respective openings in the supporting members and thereby being held together by said supporting members, said spindle means having transversely outwardly facing annular shoulders to engage with the inner sides of the respective bearing members, and said bearing members being adapted to be inserted into the respective openings transversely from the outer sides of said supporting members, and removable means on the respective bearing members positioned for engagement with the inner sides of the respective supporting members to limit displacement of said bearing members away from said roller.

9. In a conveyer a roller to turn on a transverse axis, and spindle means projecting from each end of said roller, supporting members near the ends of the rollers and having openings transversely through them, bearing members each having an upwardly open interior space receiving a respective spindle means, absorbent elements in the respective spaces over the spindle means, caps fitting on the tops of the respective bearing means, each having a downwardly extending part to limit transverse displacement of the absorbent element, said bearing members and their respective caps fitting in the respective openings in the supporting members and thereby being held together by said supporting members, said spindle means having transversely outwardly facing annular shoulders to engage with the inner sides of the respective bearing members, and said bearing members being adapted to be inserted into the respective openings transversely from the outer sides of said supporting members, and removable means on the respective bearing members positioned for engagement with the inner sides of the respective supporting members to limit displacement of said bearing members away from said roller, said bearing members being reversible in said openings and comprising means to receive said removable means for said engagement when said bearing members are reversed.

10. In a conveyer a roller to turn on a transverse axis, and spindle means projecting from each end of said roller, supporting members near the ends of the rollers and having openings transversely through them, bearing members each having an upwardly open interior space receiving a respective spindle means, absorbent elements in the respective spaces over the spindle means, caps fitting on the tops of the respective bearing means, each having a downwardly extending part to limit transverse displacement of the absorbent element, said bearing members and their respective caps fitting in the respective openings in the supporting members and thereby being held together by said supporting members, said spindle means having transversely outwardly facing annular shoulders to engage with the inner sides of the respective bearing members, and said bearing members being adapted to be inserted into the respective openings transversely from the outer sides of said supporting members, each of said bearing members having an opening through it across the axial line and lying inside the respective supporting members, and pins inserted through said openings for engagement with the inner sides of the respective supporting members to limit displacement of the bearing members away from the roller.

11. In a conveyer a roller to turn on a transverse axis, and spindle means projecting from each end of said roller, supporting members near the ends of the rollers and having openings transversely through them, bearing members each having an upwardly open interior space receiving a respective spindle means, absorbent elements in the respective spaces over the spindle means, caps fitting on the tops of the respective bearing means, each having a downwardly extending part to limit transverse displacement of the absorbent element, said bearing members and their respective caps fitting in the respective openings in the supporting members and thereby being held together by said supporting members, said spindle means having transversely outwardly facing annular shoulders to engage with the inner sides of the respective bearing members, and said bearing members being adapted to be inserted into the respective openings transversely from the outer sides of said supporting members, each of said bearing members having an opening through it across the axial line and lying inside the respective supporting members, and pins inserted through said openings for engagement with the inner sides of the respective supporting members to limit displacement of the bearing members away from the roller, said bearing members being reversible, and each one of said bearing members having an additional opening through it across the axial line to lie inside the respective supporting member when the bearing member is reversed and thereby receive a pin for said engagement, as aforesaid.

12. In a conveyer a roller to turn on a transverse axis, and spindle means projecting from each end of said roller, supporting members at the ends of the roller having openings transversely through them, said openings being of such size relative to the thickness of the spindle means at the respective ends, and said supporting members being so spaced relatively to the transverse length of said roller, that one of said spindle means may be inserted into a respective opening by a downward inclination of the roller, and then the other spindle means may be inserted into the other opening after the roller is swung down into approximately its correct position, bearing members adapted to be inserted into the respective openings transversely from the outer sides of said supporting members and receiving said spindle means in said openings, and means for limiting displacement of said bearing members.

13. In a conveyer a roller to turn on a transverse axis, and spindle means projecting from each end of said roller, supporting members at the ends of the roller having openings transversely through them, said openings being of such size relative to the thickness of the spindle means at the respective ends, and said supporting members being so spaced relatively to the transverse length of said roller, that one of said spindle means may be inserted into a respective opening by a downward inclination of the roller, and then the other spindle means may be inserted into the other opening after the roller is swung down into approximately its correct position, bearing members adapted to be inserted into the respective openings transversely from the outer sides of said supporting members and receiving said spindle means in said openings, and so fitting said openings as to swivel therein but be prevented from turning therein, and means for limiting transverse displacement of said bearing members.

14. In a conveyer a roller to turn on a transverse axis, and spindle means projecting from each end of said roller, supporting members at the ends of the roller having openings transversely through them, said openings being of such size relative to the thickness of the spindle means at the respective ends, and said supporting members being so spaced relatively to the transverse length of said roller, that one of said spindle means may be inserted into a respective opening by a downward inclination of the roller, and then the other spindle means may be inserted into the other opening after the roller is swung down into approximately its correct position, bearing members adapted to be inserted into the respective openings transversely from the outer sides of said supporting members and receiving said spindle means in said openings, each one of said bearing members having a space above the spindle means therein, absorbent elements in the respective spaces, and means for limiting displacement of said bearing members.

15. In a conveyer a roller to turn on a transverse axis, and spindle means projecting from each end of said roller, supporting members at the ends of the roller having openings transversely through them, said openings being of such size relative to the thickness of the spindle means at the respective ends, and said supporting members being so spaced relatively to the transverse length of said roller, that one of said spindle means may be inserted into a respective opening by a downward inclination of the roller, and then the other spindle means may be inserted into the other opening after the roller is swung down into approximately its correct position, bearing members adapted to be inserted into the respective openings transversely from the outer sides of said supporting members and receiving said spindle means in said openings, each one of said bearing members having a space above the spindle means therein, absorbent elements in the respective spaces, retaining elements for the respective absorbent elements fitting in said openings with said bearing members and thereby being held to said bearing members by said supporting members, means for limiting displacement of said retaining elements, and means for limiting displacement of said bearing members.

16. As a new and improved article of manufacture, a conveyer-roller bearing element of material axial length and of substantially uniformly thick U-shaped cross-section throughout its length, having openings through its sides in alinement across its axial line near one of its ends, for the purposes set forth.

17. As a new and improved article of manufacture, a conveyer-roller bearing element of material axial length and of substantially uniformly thick U-shaped cross-section throughout its length, having openings through its sides in alinement across its axial line near one of its ends, and having other openings through its sides in alinement across the axial line near the other one of its ends, for the purposes set forth.

18. In a conveyer roller mounting, a bearing member of material axial length and of substantially uniformly thick U-shaped cross-section throughout its length whereby it has a lower inner semi-cylindrical surface to support a roller-spindle, and an upwardly opening space between its upright sides to contain lubricating means, and a retaining element comprising means engaging said upright sides to limit transverse displacement of said retaining element, and comprising means to engage with the lubricating means and limit transverse displacement of said lubricating means.

19. In a conveyer roller mounting, a bearing member of material axial length and of substantially uniformly thick U-shaped cross-section throughout its length whereby it has a lower inner semi-cylindrical surface to support a roller-spindle, and an upwardly opening space between its upright sides to contain lubricating means, a retaining element comprising means engaging said upright sides to limit transverse displacement of said retaining element, and comprising means to engage with the lubricating means and limit transverse displacement of said lubricating means, and means to support said bearing members and hold said retaining element against upward displacement from said bearing member.

20. In a conveyer roller mounting, a bearing member of material axial length and of substantially uniformly thick U-shaped cross-section throughout its length whereby it has a lower inner semi-cylindrical surface to support a roller-spindle, and an upwardly opening space between its upright sides to contain lubricating means, and a retaining element comprising means engaging said upright sides to limit transverse displacement of said retaining element, and comprising means to engage with the lubricating means and limit transverse displacement of said lubricating means, and a supporting member having an opening through which said bearing member and said retaining element extend transversely, said bearing member and retaining element being thereby supported and held together by said supporting member.

21. In a conveyer roller mounting, a bearing member of material axial length and of substantially uniformly thick U-shaped cross-section throughout its length whereby it has a lower inner semi-cylindrical surface to support a roller-spindle, and an upwardly opening space between its upright sides to contain lubricating means, and a retaining element comprising means engaging said upright sides to limit transverse displacement of said retaining element, and comprising means to engage with the lubricating means and limit transverse displacement of said lubricating means, and a supporting member having an opening through which said bearing member and said retaining element extend transversely, said bearing member and retaining element being thereby supported and held together by said supporting member, said bearing member having openings through its upright sides in alinement across the axial line, and a pin projecting through said openings for engagement with a side of said supporting member, for the purposes set forth.

In testimony whereof I have hereunto signed my name in the presence of two subscribing witnesses.

KARL KIEFER.

Witnesses:
E. E. FINCH,
M. A. HARRINGTON.

Copies of this patent may be obtained for five cents each, by addressing the "Commissioner of Patents, Washington, D. C."